United States Patent

Bechamps et al.

[11] Patent Number: 5,966,492
[45] Date of Patent: Oct. 12, 1999

[54] APPARATUS FOR STORING AND SPLICING OPTICAL FIBERS

[75] Inventors: Ronald D. Bechamps, Robbinsville; Wayne L. Peterson, Edison, both of N.J.

[73] Assignee: Antec Corporation, Duluth, Ga.

[21] Appl. No.: 08/994,512

[22] Filed: Dec. 19, 1997

[51] Int. Cl.⁶ .................................................. G02B 6/00
[52] U.S. Cl. .......................................................... 385/135
[58] Field of Search ................................. 385/131–136, 385/147

[56] References Cited

U.S. PATENT DOCUMENTS

| | | | |
|---|---|---|---|
| 4,840,449 | 6/1989 | Ghandeharizadeh | 385/135 |
| 5,375,185 | 12/1994 | Hermsen et al. | 385/135 |
| 5,402,515 | 3/1995 | Vidacovich et al. | 385/135 |
| 5,428,705 | 6/1995 | Hermsen et al. | 385/135 |
| 5,490,229 | 2/1996 | Ghandeharizadeh et al. | 385/135 |
| 5,781,686 | 7/1998 | Robinson et al. | 385/135 |

*Primary Examiner*—Akm E. Ullah
*Attorney, Agent, or Firm*—William A. Hartselle

[57] ABSTRACT

A tray for storing and splicing optical fibers in a cabinet-type enclosure. The tray includes a base. Extending from opposite sides at the front of the tray are fiber entrances, through which optical fibers from a cable positioned outside the tray enter the tray. A fiber splice area in which the splicing of optical fibers can be performed is located in the front portion of the tray. A storage area in which the optical fiber are stored is located in the rear portion of the tray and includes a plurality of retainers that extend from the base of the tray. The retainers are located in positions such that when the optical fiber is stored in the tray, the retainers prevent the fiber from being bent beyond its minimum bend radius. Each retainer comprises a small tab that projects generally vertically from the base of the tray. The tray is slidably mounted within a mount. The mount includes left and right side rails that are slidably inserted into slots on the inner left and right sidewalls of the cabinet. In this manner, the mount is slidably situated within the cabinet such that the exposure of the tray is increased and the entire contents of the tray can be accessed by sliding the mount outwardly from the cabinet and sliding the tray outwardly from the mount.

6 Claims, 4 Drawing Sheets

APPARATUS FOR STORING AND SPLICING OPTICAL FIBERS

TECHNICAL FIELD

The present invention relates to the storage and splicing of cable and, more particularly, relates to a tray for storing and splicing optical fiber.

BACKGROUND OF THE INVENTION

The use of fiber optic cable as a transmission medium is common in communication systems, including cable television systems. A fiber optic cable is typically a single cable within which is provided a plurality of individual optical fibers. Each optical fiber within the cable may be used to transmit information such as voice or data via light signals.

The proper transmission of light signals is dependent upon the integrity of the cable and the fibers within the cable. Because optical fibers are somewhat delicate and prone to damage, it is imperative that the fibers within the cable be installed and maintained free of any kinks or other damage.

One of the most important parameters of an optical fiber is its "minimum bend radius." The minimum bend radius of the fiber may be different depending upon parameters such as the diameter of the particular fiber. If a fiber is bent beyond its minimum bend radius, the fiber will sustain damage that will degrade its transmission performance. Therefore, it is important that an optical fiber is stored such that it is prevented from being bent beyond its minimum bend radius.

Fiber optic communications systems typically include many interconnections, or "splices," of optical fibers, in which one optical fiber is connected to another optical fiber. Optical fibers are typically stored and spliced in a cabinet-type structure that typically includes a plurality of trays in which excess lengths of different fibers are stored and spliced. Each tray within the cabinet must maintain the integrity of the optical fibers, particularly the minimum bend radius of the fibers, to prevent damage to the fibers stored in the tray.

Typically, the cabinet-type structure consists of a frame containing a plurality of trays for storing the excess cable. Each tray typically stores at least two optical fibers and includes a a "splicing tray" in which the splicing of the optical fibers can be performed by service personnel. Each tray usually includes a fiber entrance for each fiber, a storage area, and a splicing tray. Each tray is typically slidably mounted within the cabinet to allow service personnel to pull each tray outwardly to access to its contents.

There are several existing cabinets for storing and splicing optical fibers in a plurality of trays. U.S. Pat. No. 5,490,229 describes an optical fiber distribution apparatus having a plurality of trays slidably mounted within a frame. Each tray includes a pair of circular drums around which the excess fiber is stored. However, the circular drums undesirably limit the storage area of the tray by defining a fixed path for the stored fiber. Also, there is only a single-stage sliding mount provided on the tray which desirably increases the depth of the tray in order to provide access to the entire tray. Furthermore, the splicing tray is located between the two storage cylinders which does not provide the optimum access to the splicing tray.

U.S. Pat. No. 4,840,449 describes an apparatus for organizing cable splices. This apparatus includes a base plate having two fiber entrances on a single side of the base plate. Fibers are inserted into the tray through each respective entrance and are then wrapped around at least one cylinder extending from the base plate to store the excess fiber. The tray includes a splicing tray spaced from the base plate to permit passage of optical fiber underneath the splicing tray. However, the cylinders extending from the base plate severely limit the storage area of the tray and define only a fixed path for the fiber. Also, the fiber entrances are not located on opposite sides of the tray, thus requiring the cables containing the respective fibers to be run in very close proximity to each other.

Therefore, a need exists for a tray for storing and splicing optical fiber that is easily accessible. A need exists for a tray that does not include fixed cylinders or drums that limit the path for the storage of the fiber. Also, a need exists for a tray that is slidably mounted such that the exposure of the tray is increased such that the entire contents of the tray are accessible without increasing the depth of the tray.

SUMMARY OF THE INVENTION

The present invention includes a tray for storing and splicing optical fiber in a cabinet-type enclosure. The tray includes a base. Extending from opposite sides at the front of the tray are fiber entrances, through which optical fibers from a cable positioned outside the tray enter the tray. A fiber splice area in which the splicing of optical fibers an be performed is located in the front portion of the tray.

A storage area in which the optical fibers are stored is located in the rear portion of the tray and includes a plurality of retainers that extend from the base of the tray. The retainers are located in positions such that when the optical fiber is stored in the tray, the retainers prevent the fiber from being bent beyond its minimum bend radius. Each retainer comprises a small tab that projects generally vertically from the base of the tray.

The tray is slidably mounted within a mount. The mount includes left and right side rails that are slidably inserted into slots on the inner left and right sidewalls of the cabinet. In this manner, the mount is slidably situated within the cabinet such that the exposure of the tray is increased and the entire contents of the tray can be accessed by sliding the mount outwardly from the cabinet and sliding the tray outwardly from the mount.

DETAILED DESCRIPTION OF THE PREFERRED EMBODIMENT

Figure 1:
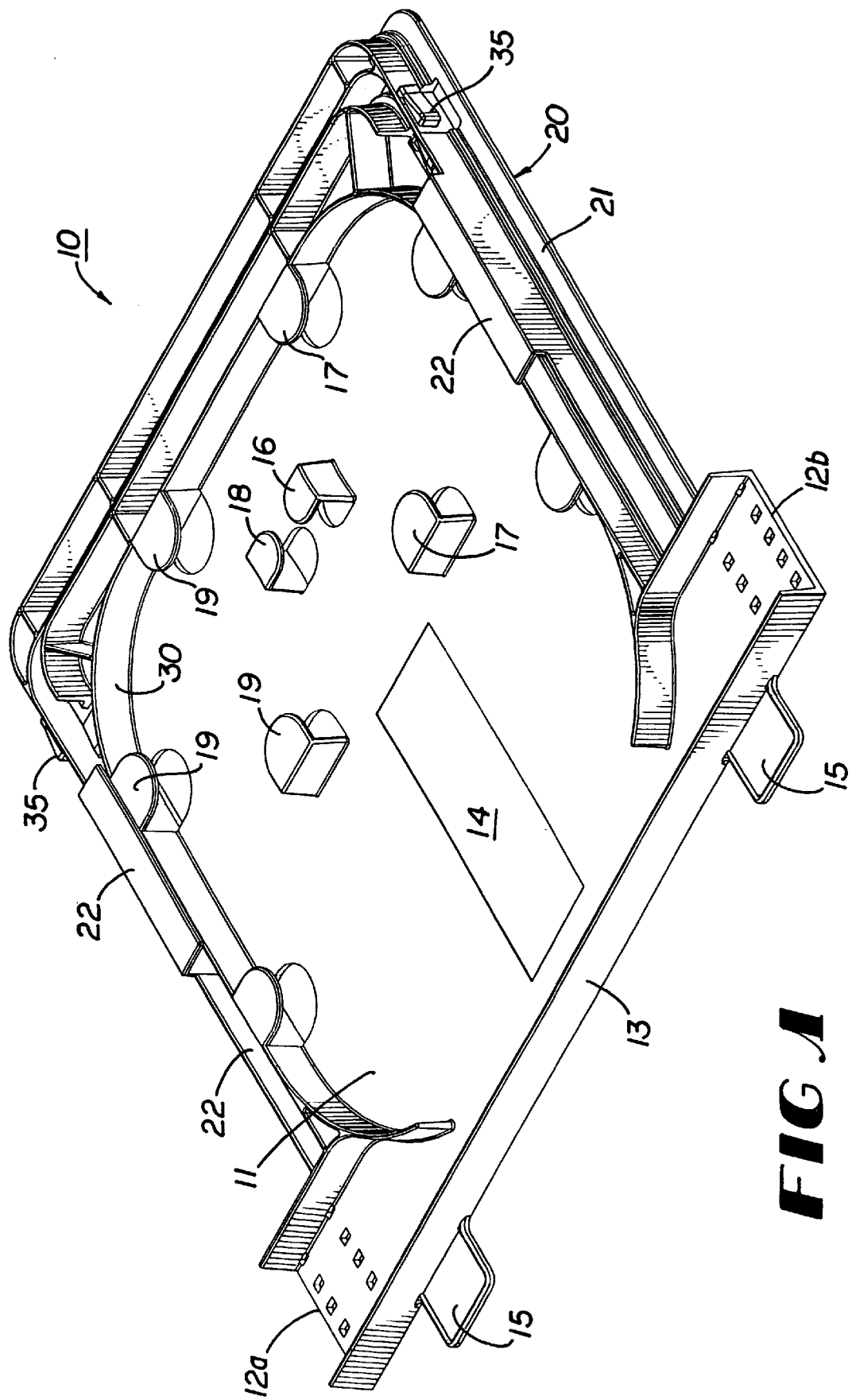
FIG. 1 is a perspective view of a tray constructed in accordance with the present invention.

The preferred embodiment of the present invention for storing and splicing optical fibers is shown in the attached figures and described herein. FIG. 1 shows a tray 10 for storing and splicing optical fibers, in accordance with the present invention. The tray 10 includes a base 11. Extending from opposite sides at the front of the tray are fiber entrances 12a and 12b, through which optical fibers from a cable positioned outside the tray enter the tray. Typically, at least one optical fiber enters the tray through entrance 12a and at least one different optical fiber enters the tray through entrance 12b. At the front of the tray is a front lip 13. Extending from the front lip 13 are tabs 15 which can be grabbed by service personnel to better enable the tray to be slid in and out of a cabinet, as will be described more fully below.

A fiber splice area 14 is located in the front portion of the tray. As is well known to those skilled in the art, the fiber splice area 14 is used by service personnel to splice two different optical fibers stored within the tray 10. A storage area in which the optical fibers are stored is located in the rear portion of the tray and includes the retainers identified by reference numerals 17 and 19. The retainers 16 and 18 are located in positions such that when optical fiber is stored in the tray, these retainers prevent the fiber from being bent beyond its minimum bend radius, as will be discussed further below. Each retainer comprises a small tab projecting generally vertically from the base of the tray. Each tab has a generally semi-circular top portion extending from the top of the tab generally perpendicular to the tray. The tray has a left side, a back, and a right side defined by a wall 30 that extends around the periphery of the tray from entrance 12a to entrance 12b.

Figure 2:
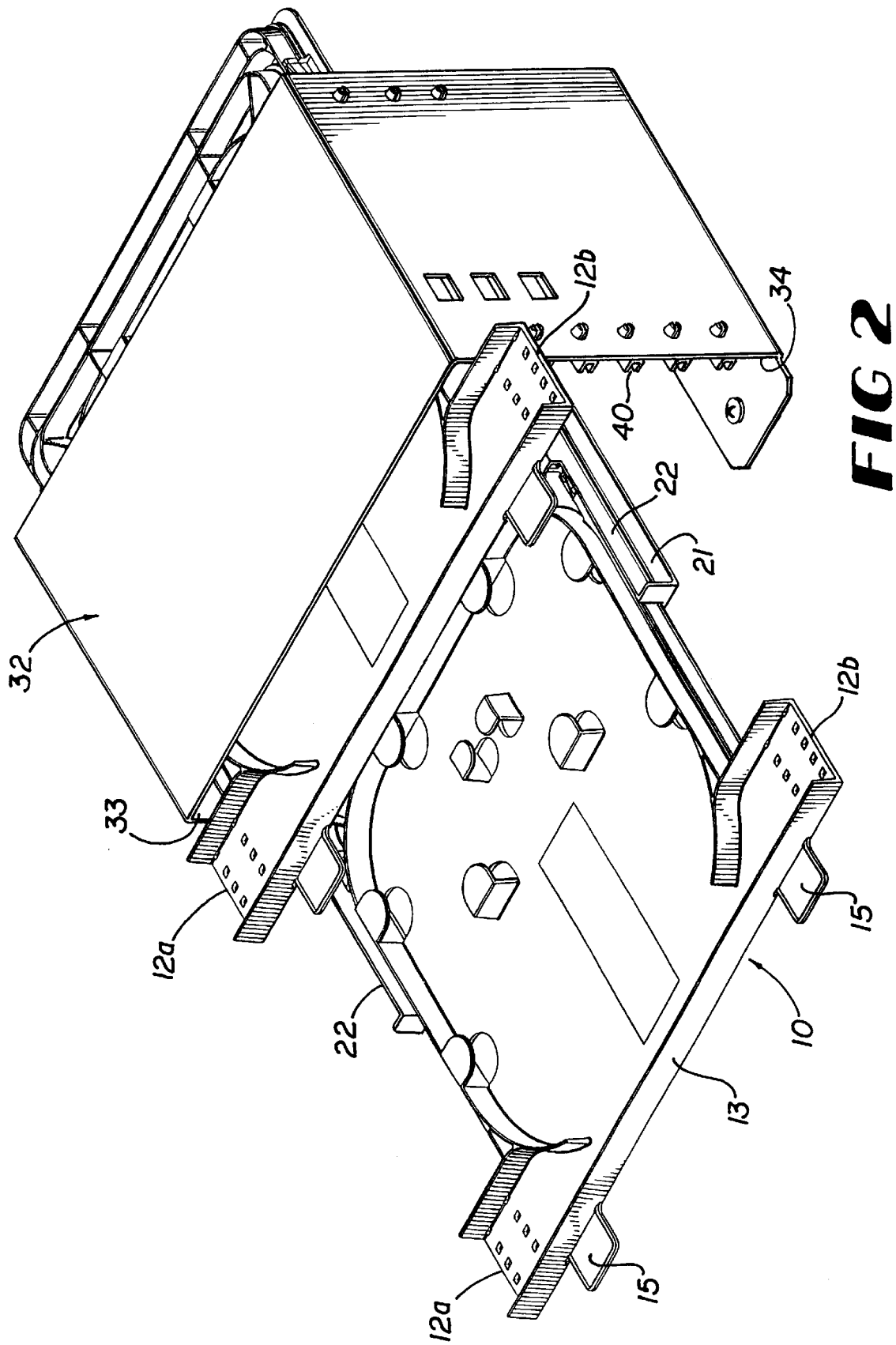
FIG. 2 is a perspective view showing the tray shown in FIG. 1 slidably mounted within a cabinet.

As shown in FIGS. 1 and 2, the tray is slidably mounted within mount 20. Mount 20 includes a bottom plate (not shown), left and right side members 22, and left and right side rails 21 that extend from respective left and right side members 22 generally parallel to the base of the tray. The base of the tray 10 is supported by the bottom plate of the mount and is slidably situated on the mount 20 between left and right side members 22. In this manner, the tray 10 can be slid outwardly from the mount 20.

Mount 20 is slidably situated within a cabinet-type structure 32 which houses a plurality of trays. As seen in FIG. 2, the entire tray does not slide completely into the cabinet 32 because the entrances 12a and 12b of the tray extend from opposite sides of the front of the tray such that the entrances limit the rearward movement of the tray into the cabinet. Left and right side rails 21 are slidably inserted into slots 40 on the inner left and right sidewalls 33 and 34 of the cabinet 32. In this manner, the mount 20 is slidably situated within the cabinet such that the exposure of the tray is increased and the entire contents of the tray can be accessed by sliding the mount 20 outwardly from the cabinet and sliding the tray 10 outwardly from the mount 20. The mount 20 is prevented from being pulled out from the slots 40 by retention clips 35 extending from the left and right side members 22, as shown in FIG. 1. The retention clips 35 limit the forward movement of the mount 20 within the slots 40 in the cabinet. Similarly, the tray 10 includes stops (not shown) that prevent the tray from being pulled out of the mount 20 during normal operation. However, the tray can be removed from the mount by disengaging the stops and then pulling the tray outwardly from the mount. The cooperation of the tray and the mount 20 work together as a two-part sliding mechanism that increases the exposure and accessibility of the contents of the tray to service personnel without undesirably increasing the depth of the tray and cabinet.

Figure 3:
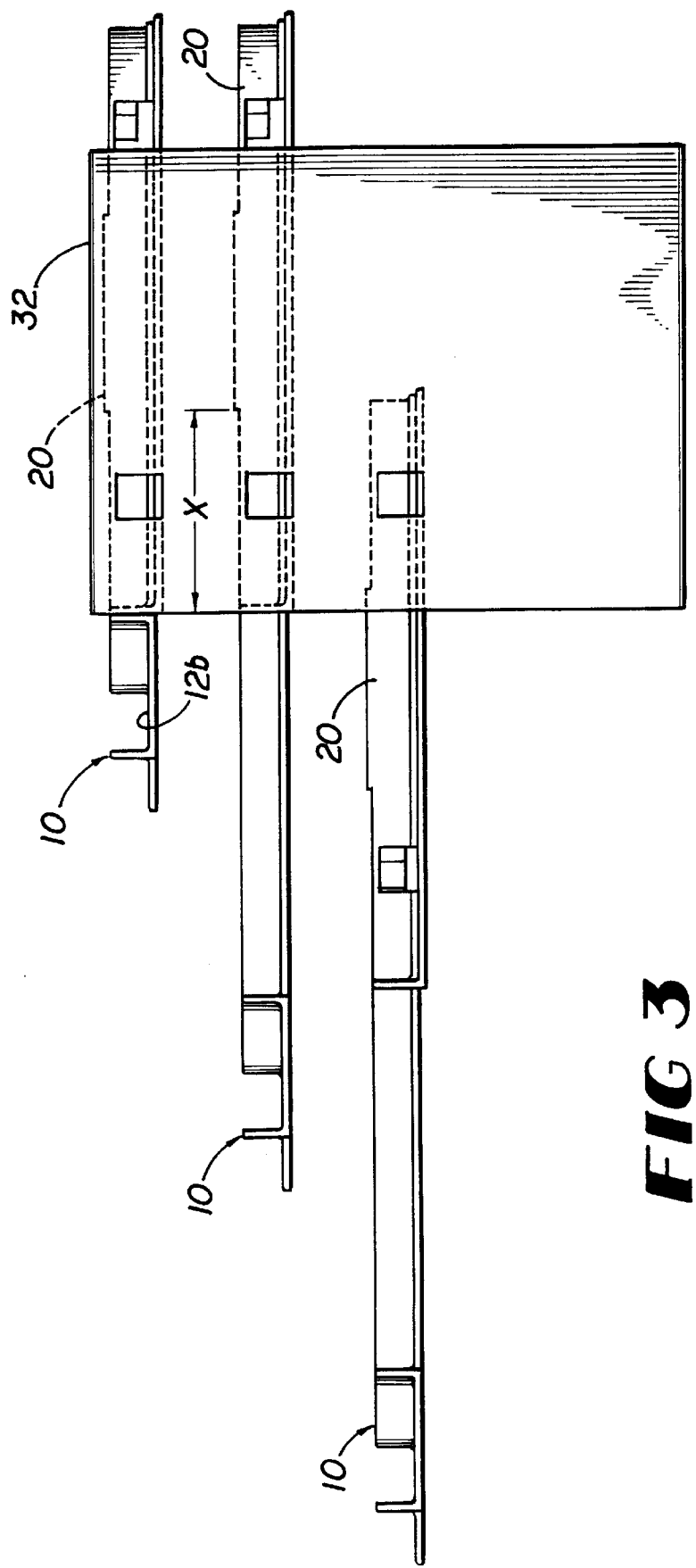
FIG. 3 is a side view of the cabinet demonstrating the slidable mounting of three trays in the cabinet.

The operation of the two-part sliding mechanism is shown in FIG. 3, which is a simplified representation of a tray 10, mount 20, and cabinet 32 in which the tray and mount are in different positions. In the top tray shown in FIG. 3, the mount 20 is entirely within the cabinet and the tray 10 has been slid into the cabinet its maximum distance. It is seen that the entrance 12b of the tray prevents the tray from being pushed entirely into the cabinet. In the middle tray shown in FIG. 3, the tray 10 has been slid outwardly within the mount 20, but the sliding mount has not been slid outwardly within the cabinet 32. It should be noted how the entire contents of the tray are not exposed when the mount 20 is entirely within the cabinet, i.e., the portion of the tray identified by reference character x is within the cabinet and not accessible. In the bottom tray shown in FIG. 3, the mount 20 has been slid outwardly from the cabinet and the tray 10 has also been slid outwardly from the mount 20 such that the entire contents of the tray are accessible to service personnel.

Figure 4:
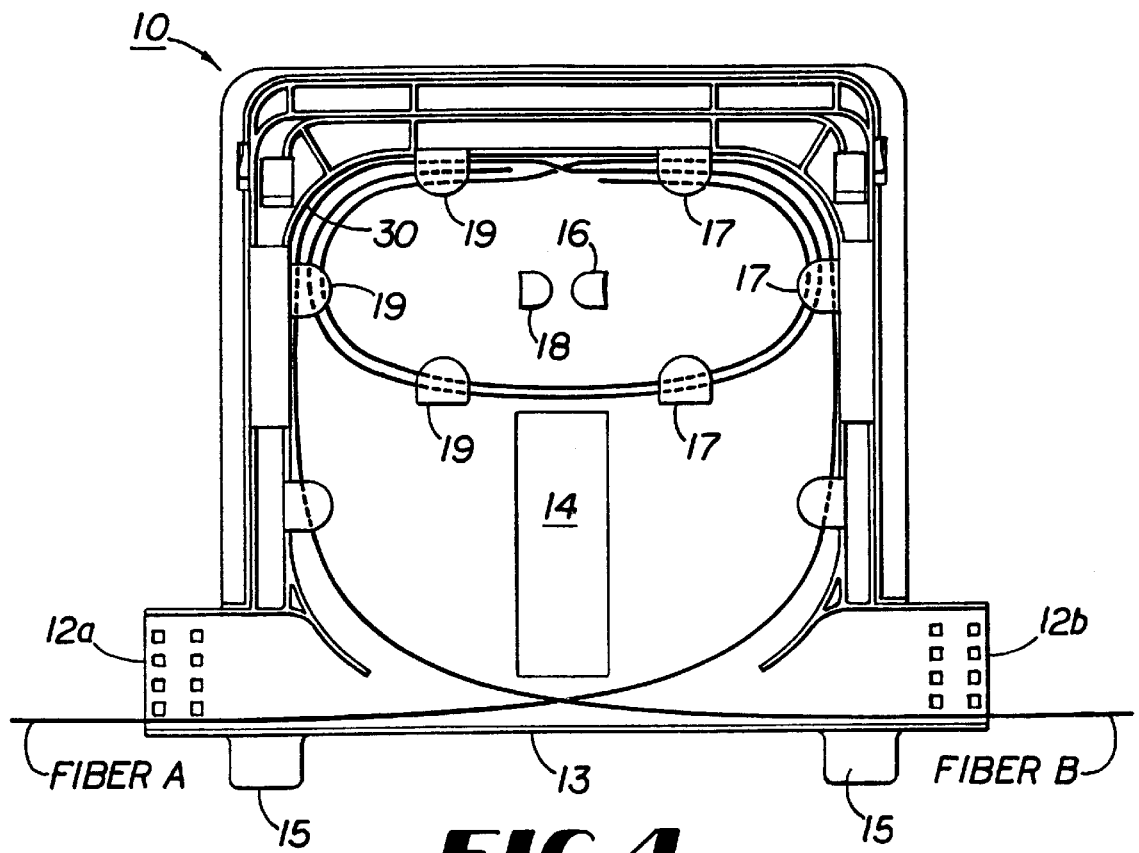
FIG. 4 is a top view of the tray showing an example of how two optical fibers may be stored within the tray.

In operation, and particularly with reference to FIG. 4 which shows one example of the storage of fibers, the optical fibers are guided into the tray 10 through entrances 12a and 12b. For the sake of discussion, the fiber that enters the tray through entrance 12a shall be referred to herein as fiber A and the fiber that enters the tray through entrance 12b shall be referred to as fiber B. It will be understood by those skilled in the art that the different optical fibers A and B may be part of a cable or cables that each may contain many optical fibers. These cables are typically routed along the outside of the cabinet and the fibers contained therein are separated from the cable and fed into the desired tray. However, it will be understood that the optical fibers can be provided to the entrances of the tray in any suitable manner.

After entering the tray, the fibers are routed toward the storage area at the rear portion of the tray. As shown in FIG. 4, fiber A is routed along the right side of the tray toward the rear of the tray. Fiber A is then routed counter-clockwise inside retainers 17 and 19. Similarly, fiber B is stored in the tray by routing the fiber along the left side of the tray toward the back. Fiber B is then routed clockwise inside retainers 17 and 19. It should be understood that the distance between opposing retainers 17 and opposing retainers 19 is such that the fibers, when stored in the tray as shown in FIG. 4, are not bent beyond their minimum bend radius. If fibers A and B are to be spliced, the ends of the fibers are placed in the fiber splice area 14 by service personnel where the splicing of the fibers is performed, as will be described below with reference to FIG. 5.

Figure 5:
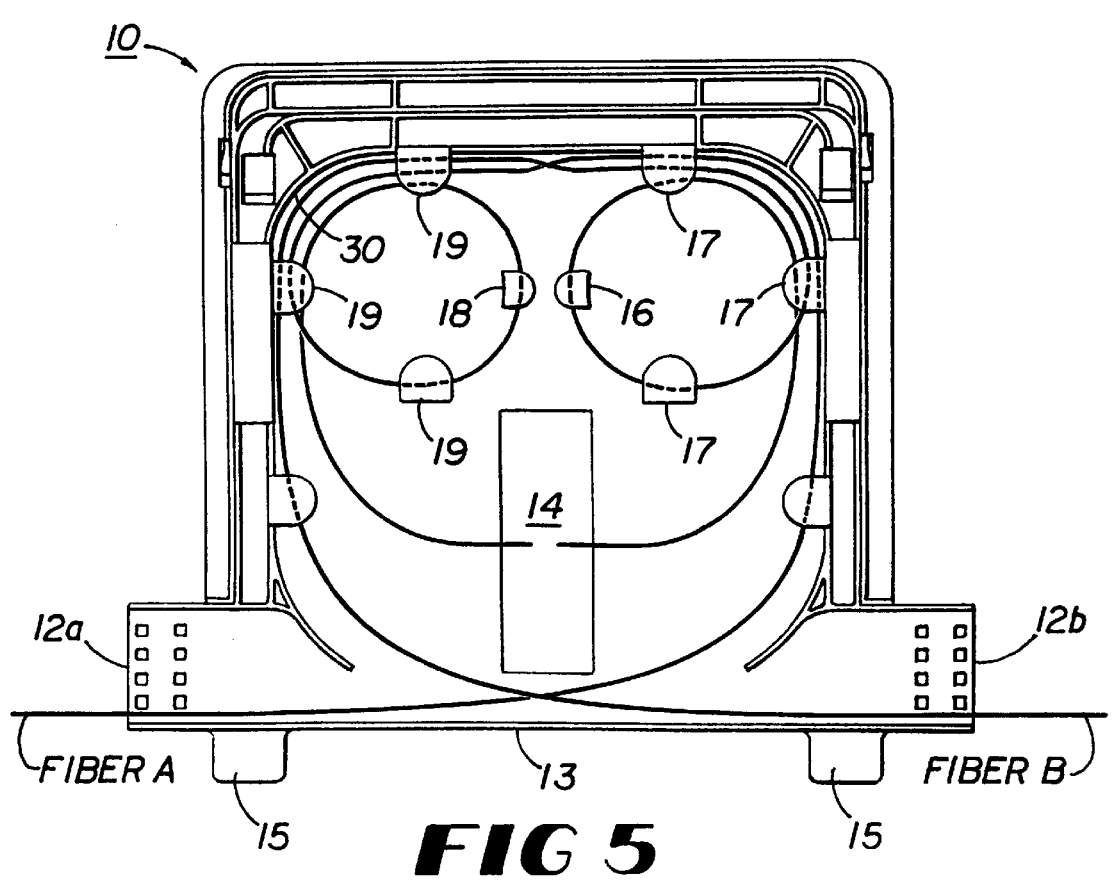
FIG. 5 is a top view of the tray showing an example of how two optical fibers may be spliced within the tray.

FIG. 5 shows another example of how two fibers, particularly fibers that are shorter than those shown in FIG. 4, may be stored and spliced within the tray 10. Fiber A enters the tray through entrance 12a and is routed from the right side, across the back, and to the left side of the tray. Fiber A is then looped around retainer 18 and inside retainers 19. The location of retainer 18 is such that when fiber A is stored as shown in FIG. 5, the fiber is not bent beyond its minimum bend radius. The end of fiber A is then routed into the fiber splice area 14. Similarly, fiber B enters the tray through entrance 12b and is routed from the left side, across the back, and to the right side of the tray. Fiber B is then looped around retainer 16 and inside retainers 17. The location of retainer 16 is such that fiber B is not bent beyond its minimum bend radius. The end of fiber B is then routed into the fiber splice area 14 where it can be spliced to the end of fiber A.

It should be understood by those skilled in the art that the storage and splicing of fibers within the tray is not limited solely to the examples described above and shown in the figures. To the contrary, the disclosed tray permits optical fibers to be stored and spliced in any other suitable orientation within the tray.

Although a preferred embodiment of the present invention has been described above by way of example, it will be understood by those skilled in the field that modifications may be made to the invention as d embodiments which are within the scope of the invention as defined by the appended claims.

What is claimed is:

1. An apparatus for storing and splicing a plurality of optical fibers, said optical fibers having a minimum bend radius, said apparatus comprising:
 a tray horizontally and slidably situated within an enclosure, said tray including:
  a base having a rear portion, a front portion, a left side, and a right side;
  at least one fiber entrance for accepting said optical fibers into the tray, wherein said fiber entrance is located at the front portion of said base and extends outwardly beyond a side of said base; and
  at least one retainer extending upwardly from the rear portion of said base for defining a path for said optical fibers such that said optical fibers are not bent beyond a minimum bend radius.

2. The apparatus of claim 1 wherein each said retainer comprises a generally vertical tab extending upwardly from the rear portion of said base.

3. The apparatus of claim 1 wherein said tray further comprises a fiber splice area located in the front portion of said tray.

4. The apparatus of claim 1 wherein said tray includes a first fiber entrance extending outwardly beyond the left side of said base and a second fiber entrance extending outwardly beyond the right side of said base.

5. The apparatus of claim 1 wherein when said tray is slid inwardly into said enclosure, said fiber entrances function as stops to halt the inward sliding movement of the tray into the enclosure, such that the fiber entrances do not enter the enclosure but remain on the outside of the enclosure.

6. The apparatus of claim 1 wherein said tray includes a front lip, and further includes at least one pull tab extending generally horizontally away from said front lip for allowing the tab to be pulled to aid in sliding said tray out of said enclosure.

* * * * *